US010915904B2

(12) United States Patent
Conway

(10) Patent No.: US 10,915,904 B2
(45) Date of Patent: Feb. 9, 2021

(54) SYSTEMS AND METHODS FOR FACILITATING NETWORK TRANSACTIONS BASED ON USER AUTHENTICATION

(71) Applicant: MASTERCARD INTERNATIONAL INCORPORATED, Purchase, NY (US)

(72) Inventor: Ryan Conway, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 512 days.

(21) Appl. No.: 15/850,074

(22) Filed: Dec. 21, 2017

(65) Prior Publication Data

US 2019/0197553 A1 Jun. 27, 2019

(51) Int. Cl.
*G06Q 20/40* (2012.01)
*G06Q 20/10* (2012.01)
(Continued)

(52) U.S. Cl.
CPC ... *G06Q 20/40145* (2013.01); *G06F 3/04886* (2013.01); *G06Q 20/10* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 5,644,727 A * 7/1997 Atkins ............... G07F 9/002
705/40
7,315,826 B1 * 1/2008 Guheen ............. G06Q 10/06
705/7.29

(Continued)

OTHER PUBLICATIONS

Guzman et al., "Security and Privacy Approaches in mixed Reality: A Literature Survey", ACM Computing Surveys, vol. 52, No. 6, Article 110, Oct. 2019.*

(Continued)

*Primary Examiner* — Frantzy Poinvil
(74) *Attorney, Agent, or Firm* — Harness, Dickey & Pierce, P.L.C.

(57) ABSTRACT

Systems and methods are provided for facilitating payment account transactions in virtual settings. One exemplary method includes prompting, by a computing device, a selection of a product for purchase from a user in a virtual reality setting where the virtual reality setting is provided by the computing device. The method further includes transmitting an authentication request to a directory server for a purchase transaction for the product. In response, the computing device receives an authentication response for the purchase transaction from the directory server. When the authentication response includes an authentication value, the computing device compiles and transmits an authorization request for the purchase transaction for the selected product, where the authorization request includes the authentication value. When the authentication response includes an indication that a challenge is required, the computing device instead causes a device associated with the user to carry out the challenge in the virtual reality setting.

16 Claims, 3 Drawing Sheets

(51) Int. Cl.
*G06F 3/0488* (2013.01)
*G06Q 20/34* (2012.01)
*H04L 29/06* (2006.01)

(52) U.S. Cl.
CPC ........... *G06Q 20/351* (2013.01); *G06Q 20/40* (2013.01); *G06Q 20/4012* (2013.01); *G06Q 20/4097* (2013.01); *H04L 63/10* (2013.01)

(58) Field of Classification Search
USPC ...................................................... 705/3–44
See application file for complete search history.

(56) References Cited

U.S. PATENT DOCUMENTS

| | | | | |
|---|---|---|---|---|
| 8,638,223 B2* | 1/2014 | Lahcanski | ............... | G06F 3/011 |
| | | | | 340/539.11 |
| 8,924,292 B1* | 12/2014 | Ellis | ................... | G06Q 30/0261 |
| | | | | 705/41 |
| 9,704,157 B1* | 7/2017 | Ellis | ................... | G06Q 30/0238 |
| 9,934,536 B2* | 4/2018 | Votaw | ................... | G06F 16/287 |
| 9,953,149 B2* | 4/2018 | Tussy | .................... | H04W 12/06 |
| 2007/0233839 A1* | 10/2007 | Gaos | ....................... | H04N 5/765 |
| | | | | 709/223 |
| 2012/0293546 A1* | 11/2012 | Lahcanski | ................ | G09G 5/00 |
| | | | | 345/633 |
| 2014/0081857 A1* | 3/2014 | Bonalle | ................ | G06Q 20/105 |
| | | | | 705/41 |
| 2015/0095219 A1* | 4/2015 | Hurley | ............... | G06Q 20/3227 |
| | | | | 705/39 |
| 2015/0127541 A1* | 5/2015 | Just | ........................ | G06Q 20/40 |
| | | | | 705/44 |
| 2015/0371226 A1* | 12/2015 | Hurley | ................... | H04L 63/08 |
| | | | | 705/64 |
| 2017/0221055 A1* | 8/2017 | Carlsson | ................ | H04L 63/10 |
| 2018/0137482 A1* | 5/2018 | Just | ........................ | G06Q 20/40 |
| 2019/0318345 A1* | 10/2019 | Kallugudde | ..... | G06Q 20/40145 |
| 2019/0362339 A1* | 11/2019 | Gurunathan | ......... | G06Q 20/363 |

OTHER PUBLICATIONS

Balducci et al., "Unstructured data in marketing", Journal of the Academy of Marketing Science 46:557-590, Year (Year: 2018).*

* cited by examiner

SYSTEMS AND METHODS FOR FACILITATING NETWORK TRANSACTIONS BASED ON USER AUTHENTICATION

FIELD

The present disclosure generally relates to systems and methods for facilitating network transactions based on user authentication, and in particular, to systems and methods for authenticating users in virtual reality settings (e.g., including in virtual reality environments, or augmented reality environments, etc.) in connection with such network transactions.

BACKGROUND

This section provides background information related to the present disclosure which is not necessarily prior art.

For a variety of network transactions, users are authenticated to accounts in order to permit and/or facilitate the transactions. In particular, consumers (broadly, users) are known to use payment accounts to fund transactions for products (e.g., goods and services, etc.) with merchants. In connection therewith, the consumers are often authenticated through personal identification numbers (PINs), biometrics, or otherwise. Once the consumers are authenticated, or as part of the authentication process, the merchants initiate purchase transactions for the products through point of sale (POS) terminals, whereby, if approved, the consumers take possession of the products and/or provide directions for the products' delivery to locations identified by the consumers.

Separately, virtual reality and augmented reality environments are known, where software cooperates with hardware to produce one or more virtual environments (referred to herein as virtual reality settings). Such virtual reality settings are either entirely virtual worlds or are composites of the real world and the virtual worlds (i.e., augmented reality). And, these virtual reality settings are known to allow users to enter therein for purposes related to entertainment, business, healthcare, education, sports, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When present in virtual reality environments, augmented reality environments, etc. (referred to herein as "virtual settings" or "virtual reality settings"), users (e.g., consumers, etc.) may desire and/or need to purchase one or more products within the virtual reality settings (e.g., for use in the virtual settings, or for use in the real world, etc.). As such, the users interact with the virtual reality setting (whereby the users are consumers, for example) to purchase the one or more products. Uniquely, the systems and methods herein facilitate authentication of the users in the virtual reality settings, consistent with enhanced authentication techniques (e.g., as described in the EMV 3D Secure™ specification, etc.), without requiring the users to leave the virtual reality settings. In particular, for example, when a consumer (broadly, a user) initiates a purchase transaction at a merchant within a virtual reality setting for a product, the merchant associated with the product seeks authentication of the consumer through a directory server and access control server (ACS). When the ACS is unable to passively authenticate the consumer using risk-based techniques, the ACS may still passively authenticate the consumer based on the consumer's biometrics (or near passively based on a challenge question posed in the virtual reality setting (e.g., to enter a passcode or password (e.g., a one-time passcode, etc.), etc.). The authorization request is then provided, from the merchant, through an acquirer and payment network to an issuer associated with a payment account for the consumer, whereby the purchase transaction is approved or not. In this manner, enhanced authentication of the consumer is provided, while the consumer remains in the virtual reality setting, with reduced and/or limited friction (e.g., with reduced and/or limited required consumer responses, etc.).

Figure 1:
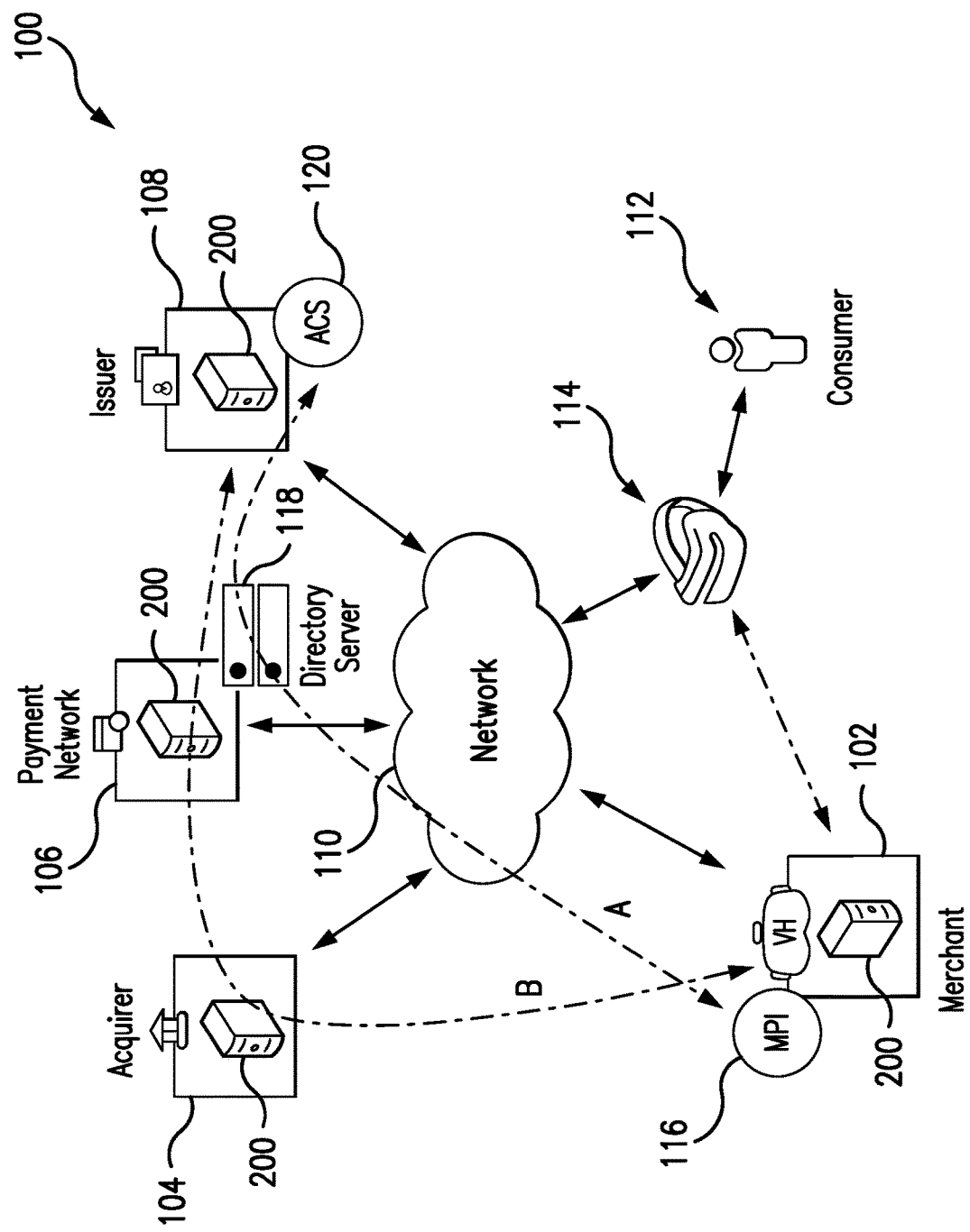
FIG. 1 illustrates an exemplary system of the present disclosure suitable for use in authenticating users in connection with network transactions by the users performed in one or more virtual reality settings.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, implementation of one or more virtual hosts in the system 100, relationships between the virtual host(s) and one or more merchant(s) and/or payment network(s) in the system 100, etc.

As shown in FIG. 1, the illustrated system 100 generally includes a merchant 102, an acquirer 104 associated with the merchant 102, a payment network 106, and an issuer 108 configured to issue payment accounts (or other accounts) to users (e.g., consumers, etc.), each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchant 102 and a consumer 112 (e.g., a communication device 114 associated therewith, etc.), etc.

The merchant 102 of the illustrated system 100 includes a virtual host (VH). The virtual host merchant 102 is configured to provide a virtual reality setting (e.g., at least one virtual reality setting, etc.) via the communication device 114, to the consumer 112. And, by interaction(s) with the communication device 114, the merchant 102 is configured to adapt, change, and/or alter the virtual reality setting.

As explained above, the virtual reality setting may include a virtual reality environment, which generally includes an entire virtual world, or the virtual setting may include one or more augmented reality environments, which include one or more composites of the real world in combination with aspect of one or more virtual worlds, etc. The virtual reality setting may be defined by a variety of themes, subject matters, stories, etc., and may be specific to a purpose of the virtual setting (e.g., education, entertainment, business, etc.). And, within the virtual reality setting, the consumer 112 may be a person, or animal, or avatar, or other character specific to the story, theme, etc. of the virtual reality setting (e.g., specific to the merchant 102, etc.).

Specifically, in this exemplary embodiment, the virtual reality setting provided by the virtual host merchant 102 includes an operation for the consumer 112 to purchase one or more products from the merchant 102. In connection therewith, the product(s) may be for use in the virtual reality setting, or the product(s) may be for use in the real world, etc. Broadly, the product(s) may include any desired product (s) within the scope of the present disclosure.

Also in the system 100, the consumer 112 is associated with a payment account, which is issued by the issuer 108. The payment account may include, for example, a credit account, a debit account, or a prepaid account, etc. The payment account is usable, by the consumer 112, as described in more detail below, to fund payment transactions with the virtual host merchant 102 (and with other merchants as desired), etc. In addition, the communication device 114 associated with the consumer 112 may include one or more different devices depending on, for example, the type of virtual setting involved in the system 100 (and provided by the virtual host merchant 102), and the accessibility thereof by the consumer 112. As illustrated in FIG. 1, for example, the communication device 114 includes a virtual headset that may be worn by the consumer 112, whereby the communication device 114 is a virtual headset communication device 114. The virtual headset communication device 114 is then configured, generally, to present the virtual reality setting (as provided by the virtual host merchant 102) to the consumer 112. In addition, the virtual headset communication device 114 may be configured to aid the consumer 112 in making movements in the virtual reality setting and/or in providing feedback for the consumer's movements in the virtual setting. In other system embodiments, the communication device 114 may alternatively (or additionally) include one or more gloves, a suit, a smartphone or tablet (e.g., with a camera to facilitate augmented reality environments and to project and/or measure movement of the consumer 112, etc.), etc. Regardless of type and/or form, the communication device 114 in general may communicate to the virtual host merchant 102 via one or more networks (e.g., the network 110, etc.), as indicated by the dotted line in FIG. 1, directly or through an intermediary (e.g., through a service provider, a separate virtual host, etc.). In doing so, when the consumer 112 moves in connection with the virtual reality setting, the communication device 114 and the merchant 102 are generally configured to cooperate in order to capture and to render the movement into the virtual reality setting.

The consumer 112 is further registered to the virtual host merchant 102, whereby the consumer 112 maintains a virtual reality account with the merchant 102. The account enables the consumer 112 to enter the virtual reality setting. To do so, however, the merchant 102 may require the consumer 112 to provide credentials (e.g., via login, etc.) to enter the virtual reality setting. The consumer's account with the merchant 102 may further include, without limitation, preferences and/or features associated with the consumer 112, which define the virtual reality setting (e.g., stories, themes, subject matters, levels, statuses, characters, etc.) and one or more credentials associated with the consumer's payment account issued by the issuer 108. The payment account credentials may include, for example, a primary account number (PAN), an expiration date, a card verification code (CVC), a token, etc. The payment account credentials may be provided by the consumer 112 during such registration (or later), or they may be retrieved by the merchant 102 (upon permission from the consumer 112). For example, upon registering, the consumer 112 may provide the payment account credentials for the payment account to the merchant 102, whereupon the merchant 102 is configured to request that a token be provisioned to the merchant 102 (and specifically the consumer's account at the merchant 102). The issuer 108 (or even the payment network 106, potentially) may be configured to then provision the token for the payment account to the merchant 102 (which in turn may then be used in connection with purchase transactions in the virtual reality setting). When received, the merchant 102 is configured to store the token in association with the consumer's account (e.g., in memory at the communication device 114, in memory at the merchant 102, etc.) for use by the consumer 112 when necessary.

With continued reference to FIG. 1, the system 100 is configured to provide one or more enhanced authentication techniques for purchase transactions involving the consumer 112 (including those performed by the consumer 112 at the virtual host merchant 102). In particular, the system 100 is configured to conform to the EMV 3D Secure™ specification for providing such enhanced authentication techniques. As such, the illustrated system 100 includes a merchant plug-in (MPI) 116, which is incorporated and/or associated with the merchant 102. The system 100 also includes a directory server 118, which is incorporated and/or associated with the payment network 106, and an access control server (ACS) 120, which is incorporated and/or associated with the issuer 108. Relative operation(s) of the MPI 116, the directory server 118, and the ACS 120, in connection with the enhanced authentication techniques included in the system 100, are described below. That said, it should be appreciated that in other embodiments, the system 100 may be configured to conform, in whole or in part, to another standard for providing enhanced authentication techniques (e.g., a standard other than the 3D Secure™ specification standard, etc.).

While only one virtual host merchant 102, one acquirer 104, one payment network 106, one issuer 108, one MPI 116, one directory server 118, and one ACS 120 are illustrated in FIG. 1, it should be appreciated that any number of these entities (and their associated components) may be included in the system 100, or may be included as a part of systems in other embodiments, consistent with the present disclosure. In addition, while the merchant 102 is described herein as a virtual host merchant, it should be appreciated that in some embodiments the merchant may include a traditional merchant and, in connection therewith, may be associated with a virtual host whereby the merchant is able to offer products for sale to consumers within virtual reality settings as described herein. Likewise, it should be appreciated that the system 100 and/or other system embodiments will generally include multiple consumers, each associated with at least one payment account and at least one communication device as described herein, and multiple merchants associated with one or more virtual reality settings.

Figure 2:
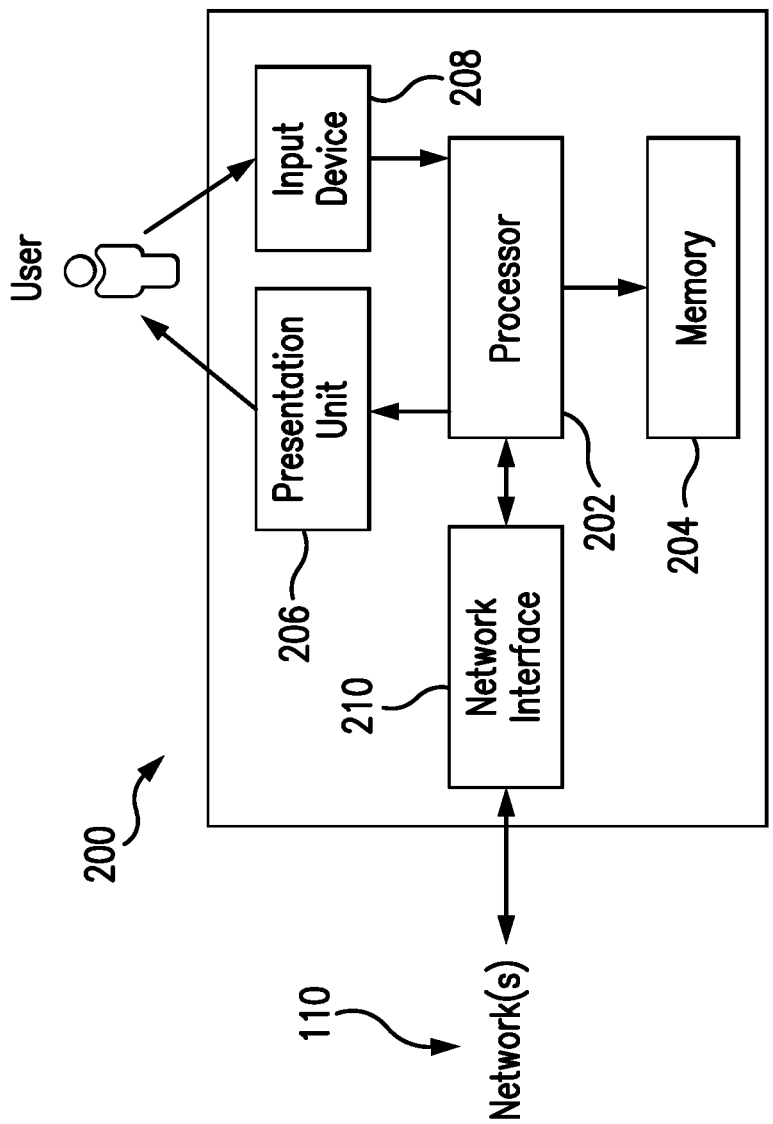
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, personal computers, laptops, tablets, smartphones, virtual reality devices (e.g., headsets, gloves, suits, etc.), etc. In addition, the computing device 200 may include a single computing device, or it may include multiple computing devices located in close proximity or distributed over a geographic region, so long as the computing devices are specifically configured to operate as described herein.

In the exemplary embodiment of FIG. 1, each of the virtual host merchant 102, the acquirer 104, the payment network 106, and the issuer 108 are illustrated as including, or as generally implemented in, computing device 200, coupled to (and in communication with) the network 110. In addition, the communication device 114 associated with consumer 112 can also be considered a computing device consistent with computing device 200. However, with that said, the system 100 should not be considered to be limited to the computing device 200, as described below, as different computing devices and/or arrangements of computing devices may be used.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account credentials, reference biometrics, captured biometrics, authentication requests, authentication responses, authentication codes (e.g., AAV codes, etc.), virtual reality settings (and executable instructions related thereto), user accounts, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, such as virtual reality settings (e.g., as defined by the virtual host merchant 102, etc.), visually, for example, to a user of the computing device 200, such as the consumer 112 in the system 100 (e.g., at the communication device 114, etc.), etc. The presentation unit 206 may include, without limitation, a liquid crystal display (LCD), a light-emitting diode (LED) display, an organic LED (OLED) display, an "electronic ink" display, speakers, virtual reality headsets, virtual reality suits, virtual reality platforms/apparatuses, etc. In some embodiments, presentation unit 206 may include multiple devices.

In addition, the computing device 200 includes an input device 208 that receives inputs from the user of the computing device 200 (i.e., user inputs) such as, for example, selections of products, selections to purchase, biometrics, etc., as further described below. The input device 208 may include a single input device or multiple input devices. The input device 208 is coupled to (and is in communication with) the processor 202 and may include, for example, one or more of a keyboard, a pointing device, a mouse, virtual headsets, virtual reality suits, virtual reality platforms/apparatuses, position sensors, fingerprint sensors, heartbeat sensors, motion sensors, a touch sensitive panel (e.g., a touch pad or a touch screen, etc.), another computing device, and/or an audio input device, etc. Further, in various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., Wi-Fi adapter, a near field communication (NFC) adapter, a Bluetooth adapter, etc.), a mobile network adapter, or other device capable of communicating to one or more different networks, including the network 110. Further, in some exemplary embodiments, the computing device 200 may include the processor 202 and one or more network interfaces incorporated into or with the processor 202.

Referring again to FIG. 1, when the consumer 112 enters the virtual reality setting, as provided by the virtual host (i.e., the merchant 102), the consumer 112 may interact with the virtual reality setting as desired, for example, by pursuing a story line, or engaging in education and/or business engagement, etc. At some time, while interacting with the virtual reality setting, the consumer 112 may encounter one or more products offered for sale by the merchant 102. Upon the consumer 112 interacting with the product, or otherwise noting or expressing interest in the product (e.g., by a gesture in the virtual reality setting, etc.), the merchant 102 is configured to prompt the consumer 112 to purchase the product in the virtual reality setting. In response, the consumer 112 may continue to interact with the virtual reality setting (e.g., ignore the merchant's prompt, etc.), or the consumer 112 may opt to select to purchase the product (e.g., by a hand movement, or other gesture, etc.).

When the consumer 112 selects to purchase the product in the virtual reality setting, the merchant 102 is configured to compile the payment account credentials and specifics of the consumer 112 (e.g., name, address, PAN, token, etc.) from the consumer's virtual account and initiate a purchase transaction for the product in the virtual reality setting. In connection therewith, the merchant 102 is configured to cause the MPI 116 to compile and transmit an authentication request (AReq) for the transaction to the directory server 118 (along path A in FIG. 1), where the AReq includes details of the purchase (and, potentially, of the communication device 114, etc.). The directory server 118 is configured to then transmit the AReq to the ACS 120 (as associated with the issuer 108 of the payment account involved in the transaction).

In turn, the ASC 120 is configured to attempt to passively determine if the consumer 112 is authenticated and/or if the purchase transaction is safe based on one or more risk-based aspects of the purchase transaction (e.g., based on if/then rules and taking into account features such as IP address, AVS, CVC2, blacklists, device ID, etc.) and gives the merchant the option of how to "Step up" authentication based on the custom rule score. For example, the ACS 120 may be configured to attempt (or employ) a risk-based authentication for the given purchase transaction, which relies on behaviors and certain aspects of the transaction to determine the riskiness thereof (e.g., consistent with EMV 3D Secure™ risk-based authentication, etc.). In connection therewith, the ACS 120 may be configured to attempt to determine whether the transition is a low-risk or high-risk transaction by relying on details included with the AReq, such as, for example (and without limitation), the shipping address for the purchase, billing address for the purchase, IP address of the communication device 114, location of the device 114, characteristics of the device 114 (e.g., screen size, device type, etc.), etc. If the details included with the AReq are sufficient to determine that the transaction is a low-risk transaction, the ACS 120 is configured to return an authentication response (ARes) to the directory server 118. The ARes, in this instance, includes an authentication code for the purchase transaction, such as, for example, an accountholder authentication value (AAV), which is consistent with the 3D Secure™ specification, etc. The directory server 118 is configured to then return the ARes to the merchant 102 (and specifically, to the MPI 116 associated therewith), back along path A in FIG. 1. In response thereto, the merchant 102 is configured to compile an authorization request for the transition.

Oftentimes, however, the details included with the AReq for the given transaction may not be sufficient for the ACS 120 to employ a risk-based authentication to passively determine whether the transaction is a low-risk or high-risk transaction. Further, even where the details included with the AReq for the given transaction are sufficient to passively employ risk-based authentication to determine whether the transaction is a low-risk transaction, the ACS 120 may still determine that the transaction is a high-risk transaction. In either of these events, the ACS 120 is configured to cause (directly or indirectly) the consumer 112 to complete a challenge as part of authenticating the consumer 112 (and the corresponding transaction).

In connection therewith, the ACS 120 may, for example, be configured to return an ARes to the directory server 118 (as above), but where the ARes, in this instance, includes an indication that passive risk-based authentication could not be completed, that the transaction is a high-risk transaction, and/or that a challenge to the consumer 112 (e.g., a biometric challenge, etc.) is required. The directory server 118, in turn, is configured to return the ARes to the merchant 102 (and specifically, to the MPI 116), again back along path A in FIG. 1. The ARes may further include information sufficient for the communication device 114 to establish a secure communication channel with the ACS 120 for purposes of completing the challenge.

In this instance, the ARes includes an indication that a challenge to the consumer 112 is required, where the challenge is a biometric challenge. In this manner, the merchant 102 may be configured to instruct the virtual headset communication device 114 to biometrically authenticate the consumer 112 (or otherwise carry out the challenge) and/or pass information to the communication device 114 (e.g., the ARes, etc.) indicating that a biometric challenge is required. The merchant 102 may be further configured to provide (e.g., via the ARes, etc.) the information to the communication device 114 allowing the device 114 to establish a secure communication channel with the ACS 120 for purposes of completing the challenge.

In response thereto, the communication device 114 may, for example, be configured to capture an image of the consumer's face, or a scan the iris of the consumer 112 via the virtual headset communication device 114. Alternatively, or additionally, virtual reality gloves and/or a virtual reality suit associated with the communication device 114 may be configured to capture a fingerprint, palm print, or a pulse/heartbeat associated with the consumer 112. Regardless of the specific biometric, the communication device 114 may be configured to compare the captured biometric to a reference biometric of the consumer 112 (e.g., stored at the device 114 or otherwise obtained thereby, etc.) and determine whether the captured biometric matches the reference biometric. The reference biometric may be stored securely on the communication device 114 (e.g., via Host Card Emulation or Secure Element, etc.). The communication device 114 may be further configured to establish a secure communication channel with the ACS 120 based on the information received from the merchant 102. And, in connection therewith, the communication device 114 may be configured to transmit an indication to the ACS 120 via the secure communication channel indicating whether the consumer 112 has been biometrically authenticated via a match (e.g., by providing a "1" for a match and a "0" for a failed match, by providing a score or confidence value for the comparison, etc.).

Alternatively, the communication device 114 may be configured to transmit the indication to the merchant 102, whereby the merchant 102 may be configured to then cause the MPI 116 to transmit the indication to the directory server 118 (along path A). The directory server 118 may be configured to then transmit the indication to the ACS 120 (as associated with the issuer 108 of the payment account involved in the transition). The indication, again, may include an indicator associated with the biometric comparison (e.g., a "1" for a match and a "0" for a failed match, a score or confidence value for the comparison, etc.).

In other embodiments (e.g., where the consumer 112 does not have a reference biometric stored, etc.), the challenge may be for the consumer 112 to complete a challenge question posed to the consumer 112 at the communication device 114 and in the virtual reality setting. In this manner, the merchant 102 may be configured to instruct the communication device 114 to pose the challenge question to the consumer 112 (or otherwise carry out the challenge question), whereby the communication device 114 may solicit a response via a keypad interface displayed in the virtual reality setting. The challenge question may, for example, be for the consumer 112 to enter a one-time passcode (e.g., a PIN specific to the consumer 112, etc.) communicated by the ACS 120 to the consumer 112, another passcode (e.g., a static passcode, etc.), a reminder for a passcode, or other response to the challenge question.

In one example, where the challenge question involves a one-time passcode, the one-time passcode may be communicated by the ACS 120 to the consumer 112 at the consumer's communication device 114 via short message service (SMS), multimedia messaging service (MMS), email, etc. In connection therewith, the communication device 114 may be configured, as part of presenting the virtual reality setting, to present (e.g., display, overlay, etc.) messages (e.g., SMS, MMS, emails, etc.) received by the communication device 114 in the virtual reality setting such that the consumer 112 need not leave the virtual reality setting to retrieve and/or view of the messages (even though the messages are being received from a separate channel than that providing the virtual reality setting). It should be appreciated that in this example, the communication device 114, in connection with presenting the virtual reality setting and the received messages, may integrate with a messaging application(s) on the communication device 114 (e.g., an SMS, MMS, or email application, etc.) to obtain the messages or be separately configured (e.g., with messaging account and/or server credentials, etc.) to obtain the messages. It should also be appreciated that the communication device 114, in connection with presenting the virtual reality setting and received messages, may be configured to filter the received messages to identify messages that are associated with a one-time passcode and/or that are received from the ACS 120, whereby messages that are not associated with a one-time passcode and/or that are not received from the ACS 120 are not presented (or are at least minimized) in the virtual reality setting. In any case, in this example, the consumer 112 may conveniently obtain the one-time pass code in the virtual reality setting and (as described more below) use the one-time pass code within the virtual reality setting (without having to leave the virtual reality setting). That said, it should be appreciated that, in some embodiments, the consumer 112 may leave the virtual reality setting to obtain the one-time passcode.

Regardless of the challenge question(s) received, the consumer 112 may enter a response to the challenge question (e.g., the one-time passcode communicated to the consumer 112, etc.) (e.g., within the virtual reality setting, etc.), whereby the response is communicated to the ACS 120 via the secure communication channel between the device 114 and the ACS 120. In addition, while a one-time, or limited time, passcode is discussed in this example, it should be understood that a more permanent (or static) passcode may be used in other embodiments, which is usable multiple times or useable until changed by the consumer 112, etc. (whereby the consumer 112 may already be aware of the passcode without the ACS 120 sending the passcode, and whereby the consumer 112 may enter the passcode in the virtual reality setting in response to the challenge question, again without leaving the virtual reality setting to retrieve the passcode).

In any event, the ACS 120 is configured to determine if the consumer 112 is authenticated and/or if the purchase transaction is safe based on the consumer's response to the challenge (whether a biometric challenge or a question challenge). When the ACS 120 determines that the consumer 112 is authenticated and/or that the purchase transaction is safe based on the consumer's response, the ACS 120, then, may be configured to return an ARes to the directory server 118. The ARes, as above, may include an authentication code for the purchase transaction, such as, for example, an AAV, which is consistent with the 3D Secure™ specification, etc. The directory server 118, in turn, is configured to return the ARes to the merchant 102 (and specifically, to the MPI 116), back along path A in FIG. 1.

Thus, even where passive risk-based authentication was unable to be completed at the ACS 120, the consumer 112 is still able to be passively authenticated via a biometric challenge (or other challenge such as answering a question or providing a one-time passcode provided to the user in the virtual reality setting (consistent with the above), etc.) using the virtual headset communication device 114 with no (or at least minimal) friction in the virtual reality setting.

In any case, thereafter in the system 100, in response to receiving the AReq that includes an authentication code for the purchase transaction, the merchant 102 is configured to compile an authorization request for the transaction, which includes the authentication code, and to conventionally transmit the authorization request to the acquirer 104 (along path B in FIG. 1). In turn, the acquirer 104 communicates the authorization message through the payment network 106 (e.g., through MasterCard®, VISA®, Discover®, American Express®, etc.) to the issuer 108. In response to the authorization request, the issuer 108 determines whether the transaction should be approved, for example, based on whether the payment account associated with the consumer 112 is in good standing and includes sufficient funds and/or credit to cover the transaction. In addition, the issuer 108 is configured to communicate with the ACS 120 to confirm the authentication code included in the authorization request (from the ARes). After approving or declining the transaction, the issuer 108 is configured to then transmit an authorization reply back, along path B, to the merchant 102, which (if approved) facilitates completion of the transaction with the consumer 112 in the virtual reality setting (e.g., by presenting a receipt to the consumer 112, by delivering the product to the consumer 112 in the virtual reality setting, etc.).

At some time later, the purchase transaction, along with one or multiple other purchase transactions, is/are cleared and settled by and between the involved parts of system 100, as is generally conventional (for example, consistent with agreements between the acquirer 104, the payment network 106, the issuer 108, etc.).

Figure 3:
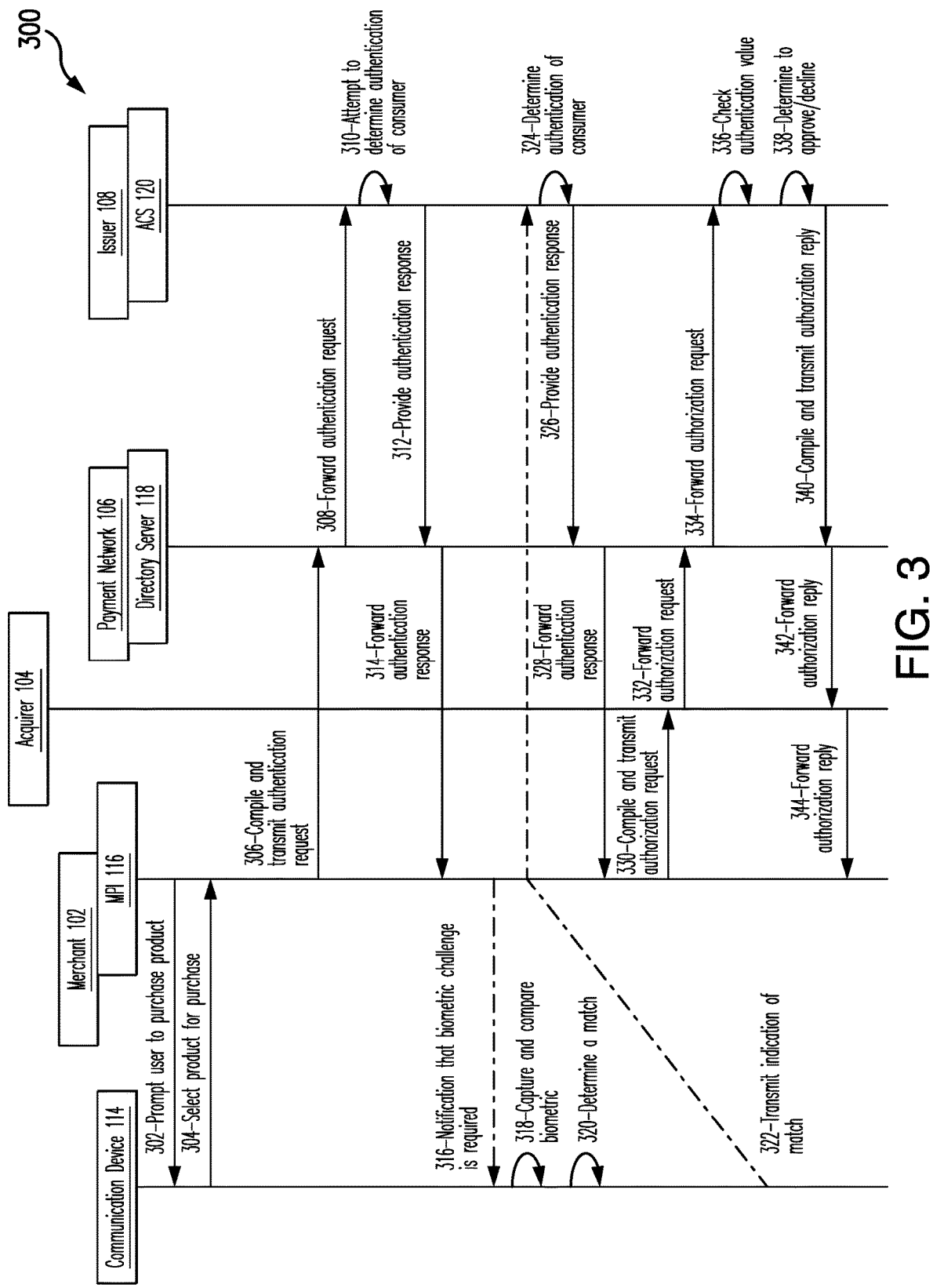
FIG. 3 is a flow diagram of an exemplary method, which may be implemented in connection with the system of FIG. 1, for authenticating a user in connection with a network transaction by the user in a virtual reality setting.

FIG. 3 illustrates an exemplary method 300 for use in authenticating users in connection with network transactions by the users, at merchants, in association with virtual reality settings. The exemplary method 300 is generally described in connection with the merchant 102, the consumer 112, and the communication device 114 of the system 100, and in conjunction with the other entities in FIG. 1. Reference is also made to the computing device 200 of FIG. 2. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the method 300, the consumer 112 is present within a virtual reality setting, which is provided by the virtual host merchant 102 to the consumer 112 via the virtual headset communication device 114. As the consumer 112 navigates through the virtual reality setting, the merchant 102 prompts the consumer 112, at 302, to purchase a product. In response, the consumer 112, at the communication device 114, provides one or more gestures (broadly, inputs) to select, at 304, the one or more products associated with the prompt to purchase in the virtual reality setting. Additional interactions between the merchant 102 and the consumer 112, via the communication device 114, may be included, as needed, or desired, to provide information associated with the product(s) (e.g., selection of color, selection of size, etc.), to provide information associated with delivery of the product (e.g., entry of an address for delivery, etc.), or to provide other relevant information, etc. In general, the information will be solicited and/or provided through the virtual reality setting and through various options included therein (e.g., graphical buttons, etc.), by the consumer 112 via the communication device 114.

In response to the consumer's selection of the one more products and/or additional interactions between the consumer 112 and the merchant 102 (e.g., within the virtual reality setting, etc.), the merchant 102 compiles and transmits an authentication request (e.g., an AReq, etc.) for the transaction to the directory server 118, at 306, where the AReq includes details of the purchase and of the communication device 114. The directory server 118, in turn, identifies the respective ACS 120 for the issuer 108 (i.e., the issuer of the consumer's payment account to which the transaction is directed) and forwards the authentication request to the ACS 120, at 308.

Upon receipt of the authentication request, the ACS 120, at 310, attempts to passively determine if the consumer 112 is authenticated and/or if the purchase transition is safe based on one or more risk-based aspects of the purchase transaction (consistent with the above description in the system 100), using passive risk-based authentication. If the details included with the AReq are sufficient to determine that the transition is a low-risk transaction, the ACS 120 provides an authentication response (e.g., an ARes, etc.) (including an authentication value) to the directory server 118, at 312, which is forwarded, from the directory server 118, to the MPI 116, at 314. The authentication response includes, among other things, the authentication value and an authentication code for the given purchase transaction by the consumer 112 (e.g., an accountholder authentication value (AAV), etc.).

Conversely, if the ACS 120 is unable to authenticate the consumer 112 using the passive risk-based authentication, or is not satisfied with a risk associated with the purchase transaction (e.g., where the ACS 120 determines that the transaction is a high-risk transaction, etc.), the ACS 120 instead provides, at 312, an ARes to the directory server 118 that includes an indication that passive risk-based authentication could not be completed, that the transaction is a high-risk transaction, and/or that a challenge to the consumer 112 is required, which is forwarded, from the directory server 118, to the MPI 116, at 314. In this converse scenario in the exemplary method 300, the challenge is then a biometric challenge (however, as described herein, the challenge could be otherwise in other embodiments (e.g., the challenge may be for the consumer 112 to enter a one-time passcode provided to the user in the virtual reality setting, consistent with the above, etc.)).

The merchant 102 then, at 316, passes information to the communication device 114 indicating that a biometric challenge is required, along with the information allowing the communication device 114 to establish a secure communication channel with the ACS 120 for purposes of completing the challenge. In response thereto, the communication device 114, at 318, captures a biometric of the consumer 112 (e.g., captures an image of the consumer's face, or scans the iris of the consumer 112 via the virtual headset communication device 114, etc.) in this embodiment. In other embodiments, virtual reality gloves and/or a virtual reality suit associated with the communication device 114 may be configured to capture a fingerprint, palm print, or a pulse/heartbeat associated with the consumer 112 (e.g., via sensors associated therewith and/or included therein, etc.). Thereafter, also at 318, the communication device 114 compares the captured biometric to a reference biometric of the consumer 112 and, at 320, determines that the captured biometric matches the reference biometric (in this example). The communication device 114 establishes a secure communication channel with the ACS 120 based on the information received from the merchant 102 and, at 322, transmits an indication to the ACS 120 via the secure communication channel indicating that the consumer 112 has been biometrically authenticated via a match.

Upon receipt of the indication from the communication device 114 that the consumer 112 is has provided an acceptable response to the challenge (e.g., is biometrically authenticated in this example, etc.), the ACS 120 determines authentication of the consumer 112, at 324. When the ACS 120 determines authentication of the consumer 112, the ACS 120 provides an authentication response (e.g., an ARes, etc.) to the directory server 118, at 326, which is forwarded, from the directory server 118, to the MPI 116, at 328. As above, the authentication response includes, among other things, an authentication value and an authentication code for the given purchase transaction by the consumer 112 (e.g., an accountholder authentication value (AAV), etc.).

With continued reference to FIG. 3, and regardless of how the authentication response is provided to the MPI 116 from the ACS, when the consumer 112 is authenticated, the merchant 102 compiles and transmits an authorization request for the purchase transaction, at 330, to the acquirer 104. The authorization request includes the details of the desired purchase transaction (e.g., a primary account number (or token) for the consumer's payment account, an amount of the transaction, a merchant ID for the merchant 102, etc.) and further includes the authentication code provided from the ACS 120 in the authentication response. As is conventional, the acquirer 104 forwards the authorization request to the payment network 106, at 332, which, in turn, forwards the authorization request to the issuer 108, at 334. The issuer 108 then checks, at 336, the authentication value included the in authorization request, based on a separate interaction between the issuer 108 and the ACS 120. The issuer 108 then further determines to approve or decline the purchase transaction, at 338, based thereon and/or on one or more other factors (e.g., account standing, account balance, available funds, etc.).

Thereafter in the method 300, at 340, the issuer 108 compiles and transmits an authorization reply to the payment network 106. The authorization reply includes the details of the transaction along with an indicator of whether the transaction is approved or declined. The authorization reply is forwarded, in turn, from the payment network 106 to the acquirer 104, at 342, and is then forwarded from the acquirer 104 to the merchant 102, at 344, whereupon the merchant 102 is able to complete the interaction with the consumer 112 within the virtual reality setting (e.g., by delivering the product to the consumer 112 (in the virtual reality setting, or otherwise, etc.), etc.).

In view of the above, the systems and methods herein permit authentication of users, consistent with enhanced authentication techniques, while permitting the users to remain in virtual reality settings, and also with minimal or no friction (e.g., with minimal requirements for consumer responses, etc.) to the users while the in the virtual reality setting.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) prompting, by at least one computing device, a selection of a product for purchase from a user in a virtual reality setting, the virtual reality setting provided by the at least one computing device; (b) transmitting, by the at least one computing device, an authentication request to a directory server for a purchase transaction for the selected product; (c) receiving, by the at least one computing device, an authentication response for the purchase transaction from the directory server; (d) when the authentication response includes an authentication value, compiling and transmitting, by the at least one computing device, an authorization request for the purchase transaction for the selected product, the authorization request including the authentication value; and (e) when the authentication response includes an indication that a challenge is required, causing, by the at least one computing device, a communication device associated with the user to carry out the challenge in the virtual reality setting.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art, that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only, and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating authentication of a user in connection with a network transaction in a virtual reality setting, the method comprising:

prompting, by at least one merchant computing device, a selection of a product for purchase from a user in a virtual reality setting, the virtual reality setting provided by the at least one merchant computing device;

receiving, by the at least one merchant computing device, the selection of the product from the user in the virtual reality setting;

transmitting, by the at least one merchant computing device, an authentication request to a directory server for a purchase transaction for the selected product;

in response to transmitting the authentication request, receiving, by the at least one merchant computing device, an authentication response for the purchase transaction from the directory server, the authentication response including an indication that a challenge is required;

in response to the authentication response including the indication that the challenge is required, causing, by the at least one merchant computing device, a communication device associated with the user to carry out the challenge in the virtual reality setting, whereby enhanced authentication of the user, through the authentication request, is employed in the virtual reality setting while the user is disposed in the virtual reality setting;

after causing the communication device associated with the user to carry out the challenge, receiving a further authentication response for the purchase transaction, the further authentication response including an authentication value; and compiling and transmitting an authorization request for the purchase transaction for the selected product to an acquirer, the authorization request including the authentication value of the further authentication response.

2. The method of claim 1, wherein the challenge is a biometric challenge; and wherein causing the communication device associated with the user to carry out the challenge includes capturing a biometric of the user and comparing the captured biometric to a reference biometric.

3. The method of claim 2, wherein the captured biometric includes an iris scan of the user; and wherein the communication device includes a virtual reality headset associated with the user.

4. The method of claim 1, wherein the authentication value includes an accountholder authentication value (AAV) consistent with a 3D Secure™ specification.

5. The method of claim 1, wherein the challenge is a challenge question; and wherein the method further comprises causing the communication device associated with the user to pose the challenge question to the user at the communication device, thereby causing a keypad interface to be displayed to the user, through the communication device, in the virtual reality setting, and to transmit a response from the user, via the keypad interface, to the challenge question to an access control server (ACS) associated with an issuer of a payment account used in the purchase transaction.

6. The method of claim 5, wherein the challenge question includes a request to enter a one-time passcode specific to the user and issued to the user by the ACS; and wherein the response from the user includes the one-time passcode.

7. A system for use in facilitating a payment account transaction within a virtual reality setting, the system comprising:

a memory including a virtual reality account for a user, the virtual reality account including a payment account credential for a payment account issued to the user; and a merchant computing device in communication with the memory, the merchant computing device including a merchant plug-in (MPI), the merchant computing device configured to:

provide a virtual reality setting to a communication device associated with the user;

prompt the user, in the virtual reality setting, to select a product for purchase;

receive, from the communication device, a selection of the product for purchase;

transmit an authentication request to a directory server for a purchase transaction for the selected product;

receive an authentication response for the purchase transaction, from the directory server;

in response to the authentication response including a first authentication value, compile and transmit a first authorization request for the purchase transaction to an acquirer, the first authorization request including the authentication value and the payment account credential for the payment account issued to the user; and in response to the authentication response including an indication that a challenge is required:

cause the communication device to carry out the challenge in the virtual reality setting, whereby enhanced authentication of the user, through the authentication request, is employed for the purchase transaction while the user is in the virtual reality setting;

receive a further authentication response for the purchase transaction, the further authentication response including a second authentication value; and compile and transmit a second authorization request for the purchase transaction for the selected product to an acquirer, the second authorization request including at least the second authentication value of the further authentication response.

8. The system of claim 7, wherein the first authentication value and/or the second authentication value includes an accountholder authentication value (AAV) consistent with a 3D Secure™ specification.

9. The system of claim 7, wherein the challenge is a biometric challenge; and wherein the merchant computing device is configured, in connection with causing the communication device to carry out the challenge, to capture a biometric of the user and compare the captured biometric to a reference biometric.

10. The system of claim 7, wherein the challenge is a biometric challenge;

wherein the system further comprises the communication device; and wherein the communication device is configured to:

capture a biometric of the user and compare the captured biometric to a reference biometric; and when the captured biometric matches the reference biometric, transmit an indication of the match to an access control server (ACS) associated with an issuer of the payment account used in the purchase transaction via a secure communication channel whereby the ACS is permitted to issue the further authentication response.

11. The system of claim 10, wherein the communication device includes a virtual headset communication device configured to capture the biometric of the user.

12. The system of claim 7, wherein the challenge includes a challenge question, the challenge question including a request to enter a one-time passcode specific to the user and issued to the user by an access control server (ACS) associated with an issuer of said payment account, the one-time passcode presented to the user in the virtual reality setting; and wherein the merchant computing device is configured to cause the communication device to pose the challenge question to the user at the communication device, thereby causing a keypad interface to be displayed to the user, through the communication device, in the virtual reality setting, and to transmit a response from the user, via the keypad interface, to the challenge question to the ACS, whereby the ACS is permitted to issue the further authentication response.

13. The system of claim 12, wherein the authentication response includes information to permit the communication device to establish a secure communication channel with the ACS.

14. A non-transitory computer-readable storage media including executable instructions for facilitating a payment account transaction within a virtual reality setting, which, when executed by at least one processor, cause the at least one processor to:
- provide a virtual reality setting to a communication device associated with a user;
- prompt the user, in the virtual reality setting, to select a product for purchase;
- receive, from the communication device, a selection of the product for purchase;
- transmit an authentication request to a directory server for a purchase transaction for the selected product;
- in response to the transmission of the authentication request, receive an authentication response for the purchase transaction, from the directory server;
- in response to the authentication response including an authentication value, compile and transmit an authorization request for the purchase transaction to an acquirer, the authorization request including the authentication value of said authentication response and a payment credential for a payment account issued to the user; and
- in response to the authentication response including an indication that a challenge is required:
  - cause the communication device to carry out a biometric challenge in the virtual reality setting and provide, to the communication device, information for establishing a secure communication channel with an access control server (ACS) associated with an issuer of the payment account used in the purchase transaction, whereby enhanced authentication of the user, through the authentication request, is employed for the purchase transaction while the user is in the virtual reality setting;
  - after causing the communication device to carry out the biometric challenge, receive a further authentication response for the purchase transaction, the further authentication response including an authentication value; and
  - compile and transmit an authorization request for the purchase transaction for the selected product to an acquirer, the authorization request including at least the authentication value of the further authentication response.

15. The non-transitory computer-readable storage media of claim 14, wherein the executable instructions, when executed by the at least one processor in connection with causing the communication device to carry out the biometric challenge, causes the at least one processor to cause the communication device to:
- capture a biometric of the user;
- compare the captured biometric to a reference biometric; and
- in response to a match between the captured biometric and the reference biometric, transmit an indication of the match to the ACS associated with the issuer of a payment account used in the purchase transaction via a secure communication channel, whereby the ACS is permitted to issue the further authentication response.

16. The non-transitory computer-readable storage media of claim 14, wherein the communication device includes a virtual headset communication device configured to capture the biometric of the user.

* * * * *